United States Patent
Paiva

[15] 3,636,649
[45] Jan. 25, 1972

[54] FISHING ROD HOLDER

[72] Inventor: Stanley H. Paiva, 2905 Julio Ave., San Jose, Calif. 95124

[22] Filed: July 27, 1970

[21] Appl. No.: 58,231

[52] U.S. Cl. ........................................... 43/21.2, 248/46
[51] Int. Cl. ................................................ A01k 97/10
[58] Field of Search .............................. 43/21.2; 248/46

[56] References Cited

UNITED STATES PATENTS

| 2,466,166 | 4/1949 | Fischer | 248/46 |
| 2,683,008 | 7/1954 | Roederer | 248/46 X |
| 2,752,115 | 6/1956 | Green | 248/46 |

FOREIGN PATENTS OR APPLICATIONS 1,542,603   9/1968   France ........................... 248/46

Primary Examiner—Samuel Koren
Assistant Examiner—Daniel J. Leach
Attorney—Milmore & Cypher

[57] ABSTRACT

A fishing rod holder for holding rods equipped with spinning reels consisting of a frame constructed with an offset portion, a forked member attached to the forward end of the frame and having pointed ends for insertion into the ground, a tail member attached to the rear of the frame having a spade-shaped end for insertion into the ground, providing a three-point support, the rod being held by an open yoke attached to the forward portion of the frame and by laterally extending, vertically spaced pins on an upstanding member attached to the rear of the frame.

3 Claims, 3 Drawing Figures

PATENTED JAN 25 1972 3,636,649
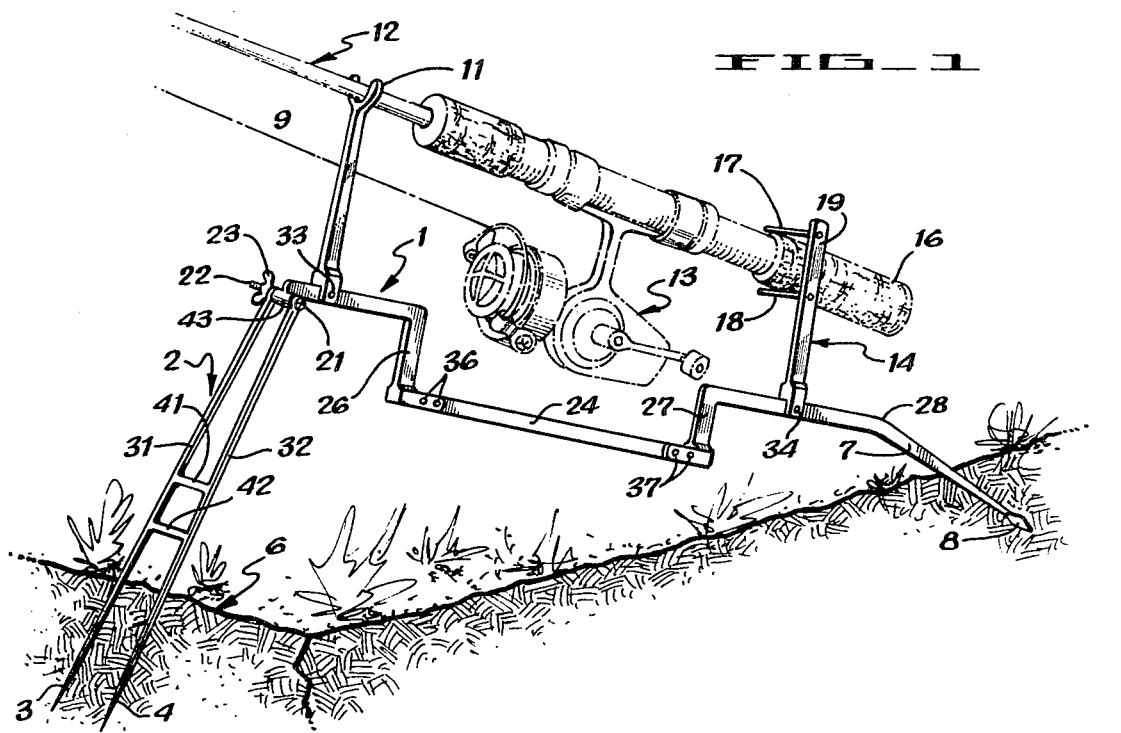
FIG_1
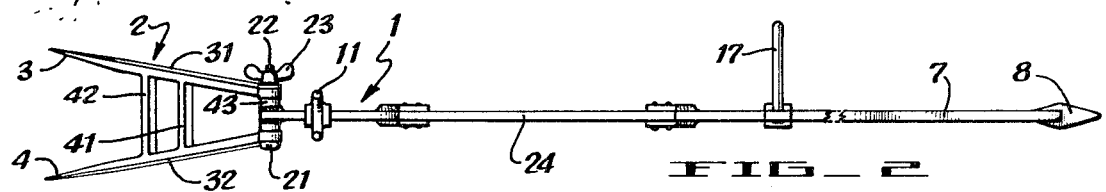
FIG_2
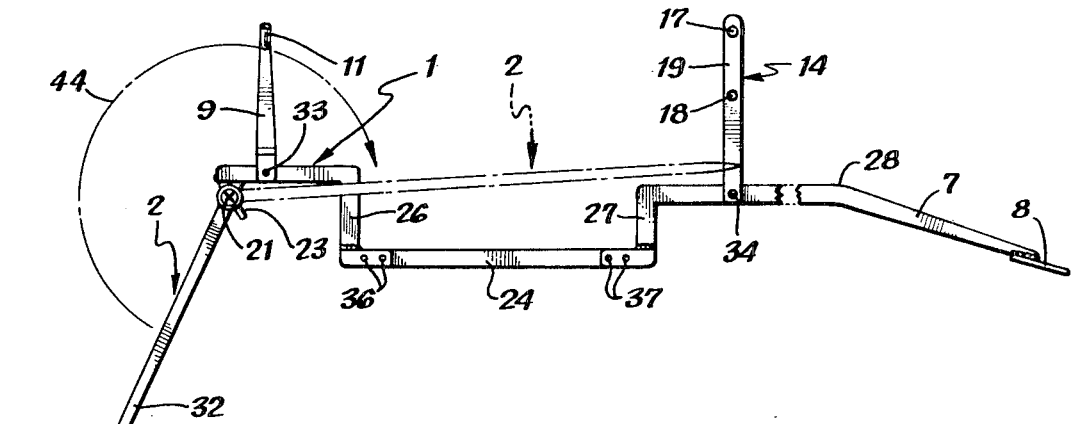
FIG_3
STANLEY H. PAIVA
INVENTOR.
BY Milmore + Cypher
ATTORNEYS

FISHING ROD HOLDER

BACKGROUND OF THE INVENTION

There are several types of fishing rod holders, but none have been found which can accommodate rods equipped with spinning reels. Since a great many persons prefer to use the spinning reel and to use a lightweight portable holder while fishing, a need has developed for such a piece of equipment. In many areas, good fishing requires backpacking equipment several miles over rugged terrain and a holder must be compact and light in weight. Further, the holder must be capable of being set up on uneven terrain. Primarily, however, the holder must permit the rod to be removed immediately from the holder once there is a bite so as to permit the sportsman to "play" the fish once it is on the line.

SUMMARY OF THE INVENTION

The gist of the invention is the use of a frame which has an offset permitting a spinning reel to be inserted therein and which is arranged to permit the rod to be quickly and easily removed from the holder.

Another object is to provide a holder which is lightweight, portable, has a few rugged parts, may be easily and quickly set up and requires little or no maintenance.

A further object is to provide a holder which will provide solid support in very uneven terrain and needs no extra counterweights, anchor chains or cords to prevent overturning of the rod and holder when a fish strikes the line.

BRIEF DESCRIPTION OF THE DRAWINGS

FIG. 1 is a perspective view of the rod holder constructed in accordance with the present invention and showing a rod and spinning reel mounted thereon.

FIG. 2 is a top view of the rod holder shown in FIG. 1.

FIG. 3 is a top view of the rod holder shown in FIGS. 1 and 2 with a portion in phantom line showing the folded position of the device.

DESCRIPTION OF THE PREFERRED EMBODIMENT

The fishing rod holder of the present invention consists briefly of an elongated frame 1; a forked member 2 pivotally attached to the forward end of the frame and having laterally spaced pointed ends 3 and 4 for insertion into the ground 6; a tail member 7 attached at the rear portion of the frame having a pointed spade-shaped end 8 for insertion into the ground; a front support member 9 attached to the forward portion of the frame and having an upwardly open yoke portion 11 for receiving the fishing rod 12 forwardly of the attached reel 13; and a rear support member 14 attached to the frame and mounted forwardly of the spade-shaped end for receiving the handle 16 of a fishing rod and being formed with a pair of laterally extending, vertically spaced pins 17 18 for releasably receiving the rod handle and preventing vertical movement of the rod and an upstanding portion 19 joining the pins and preventing lateral movement of the pole handle in one direction.

The forked member is pivoted about point 21 as shown in the drawings by using a threaded bolt 22 which is held in a fixed position by wingnut 23.

A distinguishing feature of the present holder is the downwardly offset portion 24 on the frame for receiving a spinning reel attached to the rod. The offset may be accomplished in several ways, one of which is shown in the drawings. As here shown the offset consists of a straight member and to each end is connected an L-shaped member 26 and 27. The latter member has a bend at point 28 which slants the spade downwardly so as to provide easy insertion of the spade and to elevate the rod.

The forked member is preferably formed with a pair of elongated members 31 and 32 laterally spaced at the pivot point to permit folding of the forked member about the pivot back upon the frame to form a compact unit as shown in FIG. 3. At their ends, the forked members are laterally spaced so as to provide a three-point support with the rear spade but are close enough together to form a compact, easily-handled apparatus.

The forward support is attached by a pin 33 which may either be permanently or removably attached. The latter construction permits the holder to be disassembled to make even a more compact package. In like manner, the rear support may be attached by pin 34 either permanently or removably.

The offset member may be connected by pins 36 and 37. The pins may either be permanently or removably attached. Removable pins would permit the complete disassembly for shipping or for carrying to remote fishing areas.

The pins for holding the rod handle may be curved slightly to conform to the shape of the handle and prevent accidental removal. Curving both pins in the same direction would require a slight rotary motion to remove the rod from the holder.

While the front fork members could pivot independently, preferably the members act together and are attached by brace members 41 and 42. At the pivot point, a sleeve 43 is welded to the frame to receive the threaded bolt.

In operation, the holder is carried to the place that it is to be used in the folded position as shown in phantom line in FIG. 3. Arrow 44 indicates the direction of folding of the front fork member. To set up the holder, the front fork member is unfolded in a direction opposite to the last named arrow until the fork is at 90° or greater angle to the frame. The front fork is then inserted into the ground until it is firmly embedded. Next, the tail member is inserted into the ground at approximately the final rest angle. This angle will be determined by the angle at which the fisherman wishes to elevate the rod. Next, the rod is laid in the yoke of the front support and then the handle is inserted from the lateral angle between the pins of the rear support. When a fish takes the hook, the fisherman removes the handle by grasping the handle and moving it sideways. Once the handle has cleared the pins, he may lift the rod up and then use his skill in landing the fish. The construction of the rod support also permits the front of the pole to be moved upwardly to set the hook in the fish's mouth before the handle is removed from the pins.

As can be seen from the drawing the spade portion is turned at right angles to the plane of the fork members so that when the tail is sunk into the earth, it will resist direct upward movement when a fish takes the line and causes an uplifting force on the tail of the holder. Note that the entire portion of the tail that is buried is at a shallow angle so that it too presents surface area to any uplifting force. When the spade and tail member thus constructed, it is unnecessary to use separate anchor members and counterweights to prevent the holder from overturning.

I claim:

1. A fishing rod holder comprising:
   a. an elongated frame;
   b. a forked member pivotally attached to the forward end of said frame and having laterally spaced pointed ends for insertion into the ground;
   c. a tail member attached at the rear portion of said frame having a pointed spade-shaped end for insertion into the ground;
   d. a front support member attached to the forward portion of said frame and having an upwardly open yoke portion for receiving the fishing rod forwardly of the attached reel; and
   e. a rear support member attached to the frame and mounted forwardly of the spade-shaped end for receiving the handle of a fishing rod and being formed with a pair of laterally extending, vertically spaced pins for releasably receiving the rod handle and preventing vertical movement of said rod and an upstanding portion joining said pins and preventing lateral movement of said pole handle in one direction.

2. A fishing rod holder as described in claim 1 including:
   a. said frame being formed with a downwardly offset portion for receiving a spinning reel attached to said rod.

3. A fishing rod holder as described in claim 2 including:
a. said forked member comprising a pair of elongated members laterally spaced to permit folding of said forked member about said pivot and back upon said frame to form a compact portable holder.

* * * * *